United States Patent [19]

Bernard

[11] 4,067,117
[45] Jan. 10, 1978

[54] GRADE CHECKING TOOL

[76] Inventor: Ray A. Bernard, 5853 Glasgow Road, Sylvania, Ohio 43560

[21] Appl. No.: 692,532

[22] Filed: June 3, 1976

[51] Int. Cl.² ............................................. G01C 9/00
[52] U.S. Cl. ..................................................... 33/375
[58] Field of Search ................................. 33/374–376

[56] References Cited

U.S. PATENT DOCUMENTS

| | | | |
|---|---|---|---|
| 1,329,196 | 1/1920 | Matoba | 33/375 |
| 2,520,700 | 8/1950 | Throndike | 33/375 |
| 2,746,164 | 5/1956 | Eitzen | 33/375 |
| 3,286,356 | 11/1966 | Johnson | 33/375 |
| 3,328,887 | 7/1967 | Wright | 33/374 X |

*Primary Examiner*—Charles E. Phillips

*Attorney, Agent, or Firm*—Hugh Adam Kirk

[57] ABSTRACT

A spirit level having a measuring stick slidably mounted on one end of the level with means attached to the level for clamping and releasing the free transverse movement of said measuring stick from a position near the center of the level. A separate bracket is provided for attachment to the level for the clamping means which bracket also may include guide means for the measuring stick. The clamping means comprises a spring urged frictional brake which engages the measuring stick and is releasable by a thumb operated handle slidably mounted adjacent the vial which indicates when the level is level. This guiding bracket may be longitudinally extended with respect to the level to increase the length thereof.

8 Claims, 5 Drawing Figures

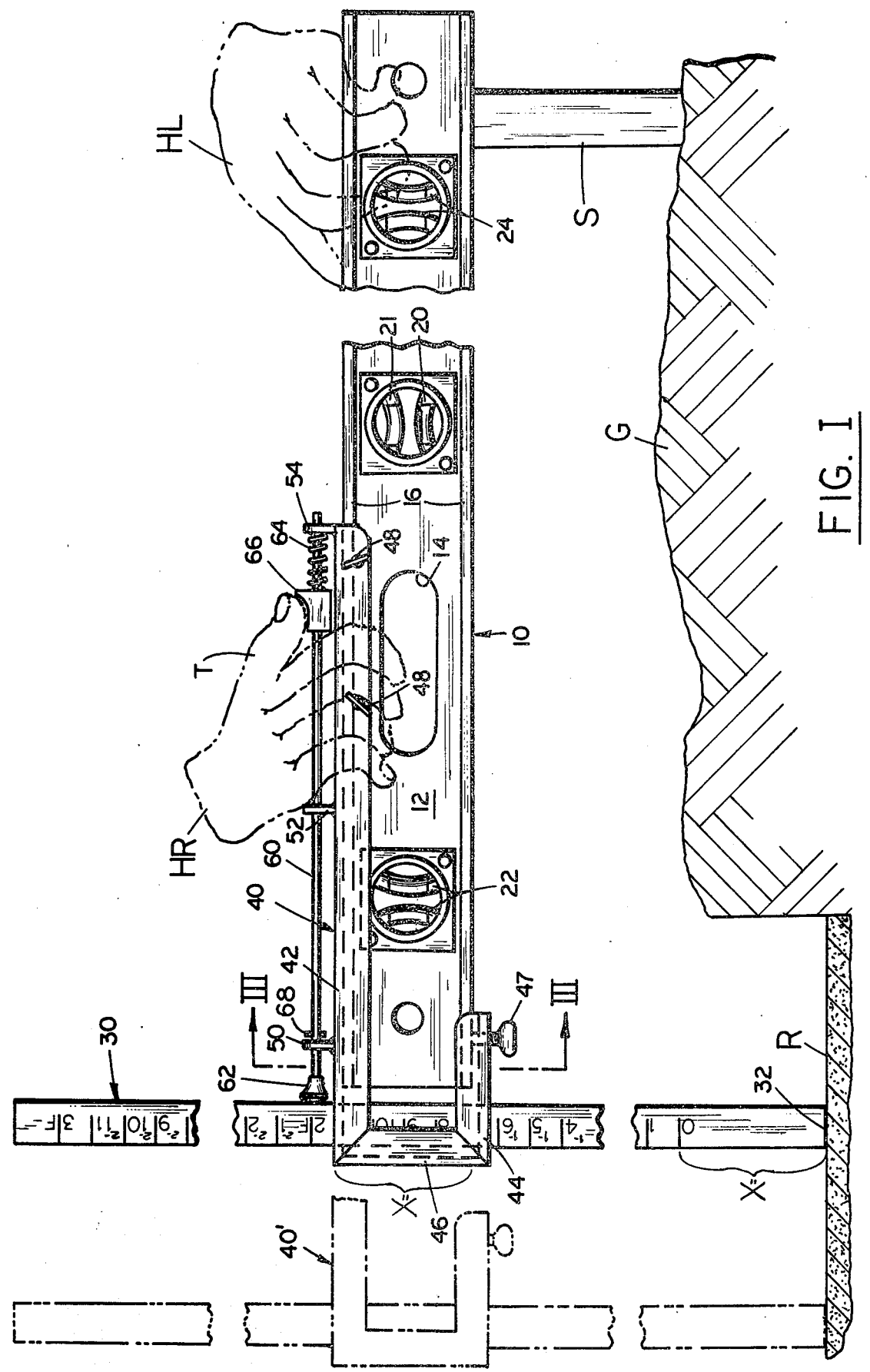
FIG. I

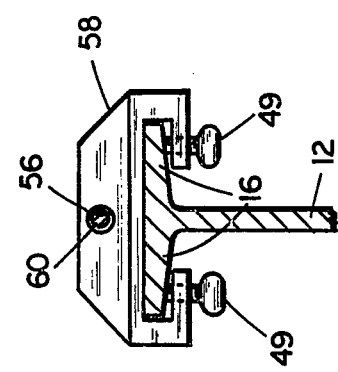
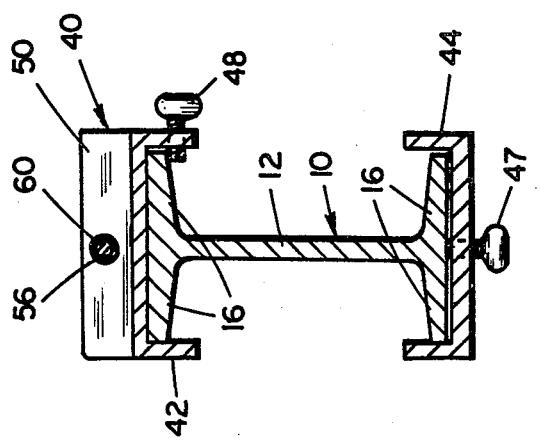
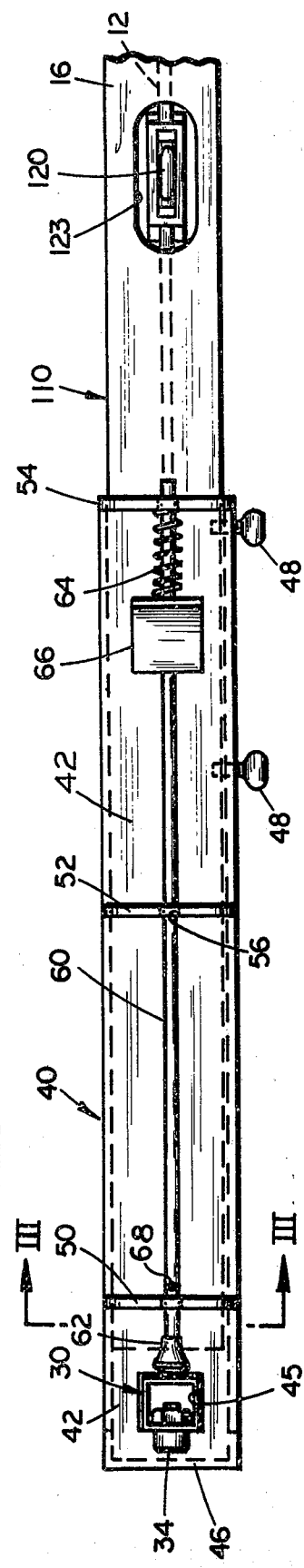

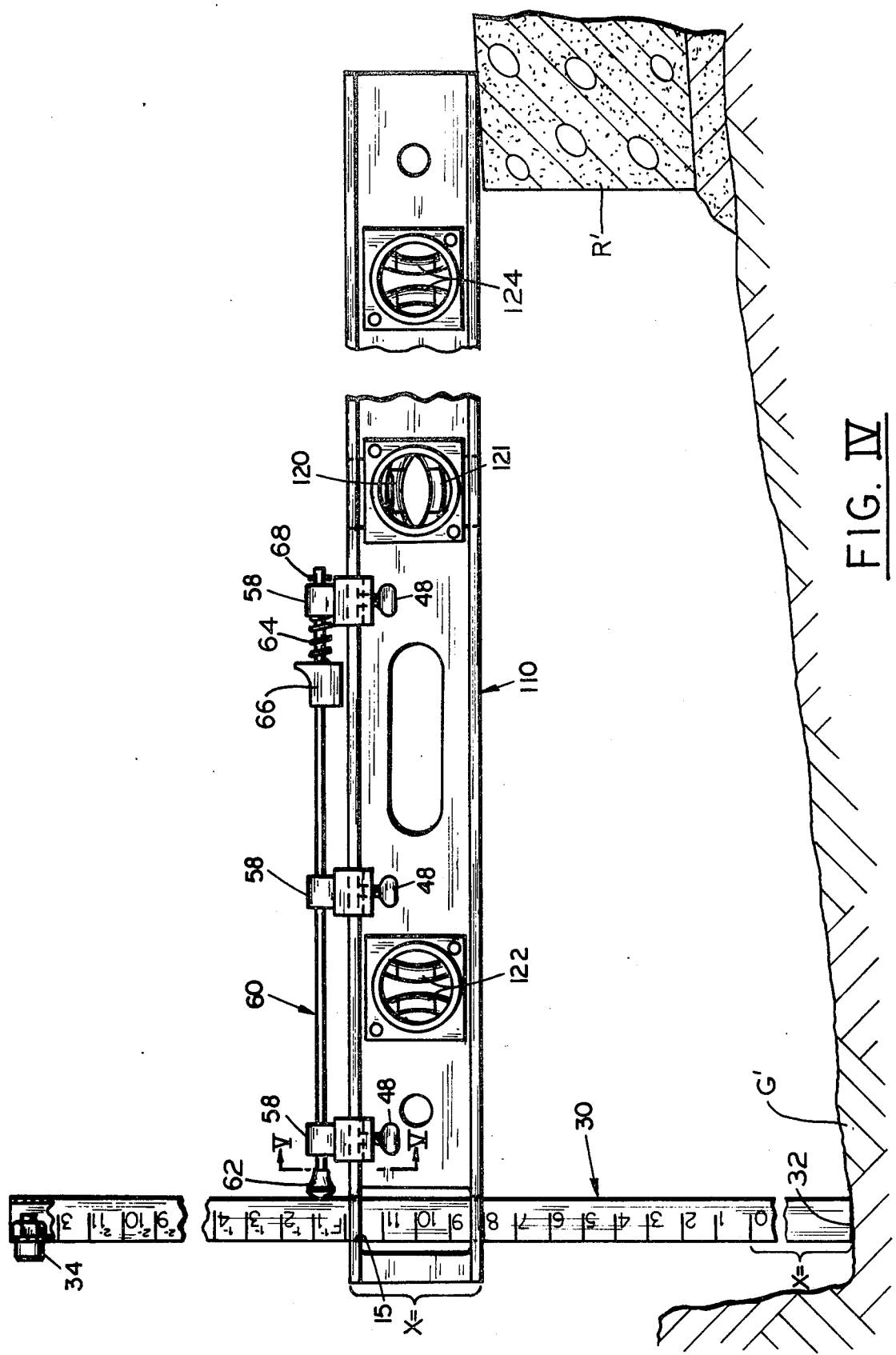
FIG. IV

GRADE CHECKING TOOL

BACKGROUND OF THE INVENTION

Although levels with transverse adjustable measuring sticks at one end thereof are known and have been used originally for the leveling of the two rails of railroad tracks, no easy means is known which can be adapted to any known standard spirit level and also can be operated from either side of the center of the level for adjusting and/or clamping the measuring sticks without reaching at least to the end of the level. Usually in road grading measurements a level and a separate measuring stick is used which requires one man to hold the level and another man to hold the stick and read the measurement thereon.

SUMMARY OF THE INVENTION

Generally speaking the tool of this invention comprises a spirit level, such as a four or five foot level used by contractors in road grading, a square cross-sectioned measuring stick of about three feet long marked on adjacent sides thereof with metric and English units of lengths and means clamped to the level for guiding and clamping the measuring stick perpendicular to and near one end of the level.

The level may be of any standard type, i.e. of wood or extruded metal such as aluminum, and usually has several vials for indicating horizontal and vertical lines or surfaces. A vial for indicating the horizontal is usually at the center of the level and may be viewed from the top edge or side of the level. If the level is made of metal, it usually has an I-shaped cross-section.

Although measuring sticks of other cross-sections than square may be employed, a square measuring stick, which may be of hollow extruded aluminum and anodized may be marked on one side in centimeters, on another side in inches and feet, and on a third side in hundreds of feet. These scale markings are spaced from one end of the stick to compensate for the vertical thickness of the level and/or bracket through which the measuring stick slides, so that the readings on the scale may be read directly and accurately from the top edge of the level or bracket within easy view of the operator of this measuring tool.

The means for guiding and clamping the measuring stick transversely of the end of the level may comprise a J-shaped bracket which fits over one end with its longer leg along the top edge of the level. This bracket may have a channel or U-shaped cross-section and be provided with thumb screws for clamping it to the sides or flanges of any standard level. Through and parallel with the bottom of the "J" of this bracket, there may be provided an aperture through which the measuring stick is guided and free to slide. Along the outside of this longer leg of this J-shaped bracket there are integrally provided a plurality of outwardly extending transverse ribs or flanges with aligned apertures therein for guiding a clamping rod parallel with the level and this longer leg of the bracket. One end of this rod is provided with a friction knob type brake which engages one side of the measuring stick and holds it in position through the aperture along the base of the J-shaped bracket. At the other end of this rod is a thumb engaging handle anchored to the rod. Between this handle or a separate pin through the rod and one of the guiding ribs is a compression spring for normally urging the knob type brake against the measuring stick to prevent it from freely sliding through its aperture guide at the base of the J-shaped bracket. If the level itself is provided with a transverse aperture for the measuring stick at or near one end of the level, separate guide brackets for the clamping rod may be clamped along the top edge of the level for supporting at least the ends of the rod.

OBJECTS AND ADVANTAGES

Accordingly it is an object of this invention to provide a simple, efficient, accurate, direct reading, effective, economic, easy to operate, and easy to use tool for checking the fine or rough grading for a road bed, for the setting of a stringline, for the setting of forms along a road, and/or for checking the grade of a finished pavement by contractors, engineers, or inspectors, and the like.

Another object is to provide such a tool which may be preset, adapted to any standard level, and may be operated by one man from either side thereof and does not require clumsy reaching and/or viewing of a level and a remote measuring rod.

Still another object is to produce such a grade measuring tool which is light in weight, easily knocked down for storage, carrying, and transport, and gives an instant read-out in either English or metric units of measurements.

BRIEF DESCRIPTION OF THE VIEWS

The above mentioned and other features, objects and advantages, and a manner of attaining them are described more specifically below by reference to embodiments of this invention shown in the accompanying drawings; wherein:

FIG. I is a side elevation of one embodiment of the invention with parts broken away, and showing in dotted lines an operator's hands and the extensibility of the guiding means for its measuring stick;

FIG. II is a plan view of the left end of the embodiment shown in FIG. I on another type of level as shown in FIG. IV;

FIG. III is an enlarged sectional view taken along line III—III of FIG. I or II;

FIG. IV is a view similar to FIG. I of another embodiment of the invention; and

FIG. V is an enlarged sectional view similar to FIG. III taken along line V—V of FIG. IV showing another means of clamping a guiding means to a metal spirit level.

DETAILED DESCRIPTION OF PREFERRED EMBODIMENTS

A — Operation

Referring first to FIG. I there is shown a stake S in ground G which has been graded to a level for road R, and the tool of this invention is now checking the depth of the road R or its surface from the top of the stake S, or the height of the road R'0 from a ground gutter G' as shown in FIG. IV. This tool comprises a spirit level 10, a measuring stick 30 and a means for clamping and guiding the stick 30 comprising in this embodiment a J-shaped bracket 40 clampable over the end and along the top edge of the level 10 and having aligned guiding apertures 45 (see FIG. II) through its two parallel legs for the free vertical movement of the measuring stick 30. Attached along the outer surface of the longer leg 42 of the bracket 40 is a clamping rod mechanism 60 having a friction engaging resilient or rubber knob 62 normally urged by a spring 64 against the measuring stick 30 to prevent it from sliding through the guide holes 45 in the parallel legs 42 and 44 of the bracket 40. Attached to the rod 60 is thumb handle 66 which is engageable by the thumb T on either right or left hand HR or HL of the operator to release the grip on the measuring stick 30 so that it can drop by gravity until its tower end contacts the surface of the road R. When the operator views the spirit or vial 20 or 120 to be horizontal, he then releases his thumb T and the knob 62 clamps the measuring stick 30 so that exact vertical distance between the surface of the road R and the top of stake S is directly readable from the figures marked on the measuring stick 30 at the surface of the longer leg 42 along the top of the level 10. It is to be understood that this or the desired distance reading may be preset and the tool used in the same manner to determine whether or not the distance between the top of the stake S and the level of the road R is below, above or at the required grade. Also if the level 10 is not sufficiently long, the bracket 40 may be extended into the dotted position 40' so that the vertical distance or grade can be measured further away from a stake S than the normal length of the level 10. It is to be understood also that this tool can be used for setting stringlines, setting forms, and checking the finished road surfaces.

B — Spirit Levels

Although an aluminum extruded and anodized level with an I-shaped cross-section is shown in the Figures for the levels 10 and 110, it is to be clearly understood that this spirit level may be made of wood or other material without departing from the scope of this invention. Usually these spirit levels comprise six vials, two near each end for measuring verticals, and two in the center of the level for measuring horizontals; the two or pairs of vials being for easy reading from either end or either side of the level. The specific levels 10 and 110 shown, however, have I-shaped cross-sections with a web 12 and top and bottom opposing flanges or working surfaces 16. The web 12 may be provided with additional apertures such as 14 to lessen its weight and/or to provide hand grips or holds. The centrally located pair of vials and 20 and 21 in the level 10 (see FIG. I) may be arched as shown in FIG. I so that the operator has to lean over the side of the level to read the lower vial 20, or the central vials 120 and 121 may be arched in opposite directions as shown for the level 110 for viewing through apertures 123 in the top and bottom flanges 16 of the level (see FIGS. II and IV) to ease and improve the posture of the operator in operating the tool. The pairs of vials 22 and 24, 122 and 124 at the ends of the levels 10, 110, respectively, are at right angles to those of the pairs set at the center of the level 10.

If desired, instead of having the guide holes for the measuring stick 30 formed in the J-bracket 40 as mentioned above, a guide hole 15 for the measuring stick 30 may be placed directly through and near the end of the level itself as shown in FIG. IV, thus eliminating the J-bracket 40 and employing only separate clamps 58 along the top edge of the level for guiding the clamping rod 60. However this embodiment requires a special level, or the drilling of the hole in the end of a standard level, while the embodiment showing the J-bracket in FIG. I may be adapted to any standard level regardless of any minor variations in width, thickness, or cross-sectional configuration.

C — The Measuring Stick 30

Although any type of a measuring stick such as a yard stick, a meter ruler, or the like may be employed with the tool of this invention provided the aperture 45 or 15 for guiding it permits it to freely slide therethrough at or near the end of the level 10 or 110, it is preferable that a square guiding stick 30 be employed which provides more than two surfaces upon which different scales may be printed easily. In this instance the measuring stick 30 is composed of hollow square extruded aluminum which may be anodized, although sticks of other materials, solid or hollow, and of other cross-sections may be used without departing from the scope of this invention. In this particular instance, three of the sides of the measuring stick 30 are scaled respectively into half centimeters, feet and inches divided into eighths, and feet divided into tenths with each tenth being divided into tenths to give hundredths of feet. The important part of being able to read this scale directly with this tool is that the scales marked along the stick 30 start a distance X above the lower end 32 of the stick 30 as shown in FIGS. I and IV, which distance X corresponds with the thickness X of the level 110 or the thickness of the level 10 plus the thickness of the longer leg 42 of bracket 40. Thus if other than the level furnished with the tool is employed, or the bracket is used with another standard level, the end 32 of the measuring stick must be cut to correspond exactly to this distance X. However if the level is supplied with the measuring stick and its guiding means as a complete tool or unit, this distance X would have already been known and the measuring stick's end 32 cut to proper length.

If desired there may be provided a stop 34 (see FIGS. II and IV) at the opposite or upper end of the measuring stick 30 to prevent it from falling completely through its guiding aperture 45 or 15 in the bracket 40 or end of the level 110, when the clamping means 60 is released and the distance between the top of the stake S and the surface of the road R is greater than the length of the measuring stick. This stop 34 is optional and aids in preventing the measuring stick from being easily separated from the level and possibly becoming lost.

D — Guiding and Clamping Means

One embodiment of the guiding and clamping means shown in FIGS. I, II, and III, comprises a J-shaped bracket 40 having its longer leg 42 substantially equal to about half the length of the level 10, and its shorter parallel leg 44 spaced therefrom by the base portion 46. This J-shaped bracket 40 may be made out of a strip of a metal channel of U-shaped cross-section as shown in FIG. III and formed to provide ample room for the variations in width and thickness of different standard levels. Adjacent the base portion 46 are aligned square apertures 45 in the legs 42 and 44. These apertures 45 as well as apertures 15 in the level 110 itself, are slightly larger than the cross-sectional configuration of this measuring stick 30, so that it may freely slide through them.

This J-bracket 40 is slipped over an end of a level 10 and then clamped to it by means of thumb screws 47 and 48 turnable in threaded apertures in the racket's shorter leg 44 and side flanges for grabbing, respectively, the bottom outer edge of the level's flanges 16 as shown in FIGS. I and III, and the undersides of the upper level flanges 16. In the event that the bracket is to be extended as shown in dotted lines in FIG. I, then of course the thumb screw 47 is released and the thumb screws 48 are reset to engage the upper flanges 16 of the bracket 40 at another location farther from the center of the level 10.

Mounted on the upper or outer side of the longer leg 42 of the bracket 40 are a plurality of transverse guiding ribs or flanges 50, 52 and 54 having central apertures 56 for supporting and guiding a longitudinally extending clamping rod 60. These brackets 50, 52 and 54 are preferably welded or otherwise attached integrally to the outside of the longer leg 42 of the bracket 40 in the embodiment as shown in FIGS. I, II and III.

However, in the embodiment shown in FIGS. IV and V, in which the aperture 15 for guiding the measuring stick 30 is in the end of the level 110 itself, then only separate similar brackets 58 (see also FIG. V) need to be provided, each of which contains a rib or flange with an aperture 56 for guiding the rod 60. These separate C-shaped brackets 58 may be attached to the underside of the flanges 16 fo the level 110 by a pair of thumb screws 49 as shown in FIGS. IV and V, or they may be clamped by a single thumb screw 48 as shown in FIG. III. This latter means with the one thumb screw 48 is especially used for levels with rectangular cross-sections.

The clamping rod means 60 guided in the ribs 50, 52 and 54 or separate brackets 58 through their apertures 56, has attached to one end thereof a rubber or other highly friction engaging knob or brake means 62 to clamp against the surface of the stick 30 and prevent it from sliding through its apertures 45 or 15, respectively. Preferably this is the surface of one of four surfaces which does not contain the scale markings thereon so that the friction of this brake will not blur or wear off these markings. Near the opposite end of this rod 60 there is provided a thumb handle 66 which is keyed or otherwise fixedly attached to this rod 60. Between this handle 66 and the end rib or flange 54 there may be provided a helical compressing spring 64 which urges the frictional knob 62 against the measuring stick 30 to hold it normally in a fixed position. To prevent this rod from sliding out too far when the stick 30 is removed from its guiding apertures 45 or 15, a stop pin 68 may be placed diametrically through the rod 60 for abutting the ribs or flanges 50, 52, 54 or brackets 58. Thus before th gauge can be reset or set automatically the spring 64 must be compressed by action of the thumb T against the handle 66 as described in Section A above so as to permit free the sliding of the measuring stick 30 through its apertures 45 or 15, or the fall by gravity, until the end 32 of the stick 30 hits the surface to be measured. It is understood however that this spring 64 and stop 68, as well as other stops 68, may be placed elsewhere along the rod 60 and pressed agains the other of the ribs or flanges 50, 52 and other brackets 58, as desired without departing from the scope of this invention.

Also it is to be clearly understood tha the features of the different embodiments shown and described above may be interchanged without departing from the scope of this invention, such as the interchanged of the types of clamps and thumb screws and their locations, the types and shapes of the brackets, the types of scales placed upon the measuring stick 30, the number, location, and apertures for the vials, the types of spirit levels, and so forth.

While there is described above the principles of this invention in connection with specific apparatus, it is to be clearly understood that this description is made by way of example and not as a limitation to the scope of this invention.

I claim:
1. In a grade checking tool comprising:
   A. a longitudinal spirit level having a web with top and bottom transverse working surfaces, at least one vial near its center,
   B. a measuring stick movable transversly of said level, and
   C. means on said level for guiding and clamping the movement of said measuring stick,
   the improvement is said guiding and clamping means comprising:
   a. a guide aperture extending transversely through said level near an end thereof and through which aperture said measuring stick is freely slidable,
   b. longitudinally slidable rod means parallel to said level extending along the major portion of the distance between said aperture and said central vial,
   c. a resilient friction knob attached to one end of said rod means for engaging said measuring stick,
   d. spaced guide bracket means adjustably attached to one of said working surfaces for guiding said rod means, said bracket means having thumb screws for clamping said guide bracket means to said working surface and said bracket means having upstanding flanges with apertures therein for guiding said rod means,
   e. thumb-engaging manual means on said rod means between the two flanges most remote from said guide aperture and adjacent said central vial for longitudinally moving said rod means to disengage said knob from said measuring stick to permit said stick to slide freely through said guide aperture, whereby said measuring stick is movable and directly readable by a single operator of said tool from either side of said tool,
   f. spring means between the flange which is most remote from said guide aperture and said manual means for longitudinally urging said knob on said rod means towards said guide aperture for frictionally engaging said measuring stick for normally preventing said stick from freely sliding through said guide aperture, and
   g. stop means on the other end of said rod means to prevent longitudinal movement of said rod means past the aperture of said most remote flange.

2. A tool according to claim 1 wherein said measuring stick has a plurality of longitudinal surfaces upon each of which is indicated a different scale.

3. A tool according to claim 1 wherein said spring means comprising a helical spring around said rod means.

4. A tool according to claim 1 wherein said stick includes a stop means for limiting its longitudinal movement through said guide aperture.

5. In a grade checking tool comprising:
   A. a longitudinal spirit level having at least one vial near its center,
   B. a measuring stick movable transversely of said level, and C. means on said level for guiding and clamping the movement of said measuring stick, the improvement in said guiding and clamping means comprising:

a. a J-shaped bracket means of channel shaped cross-section adjustably mounted over one end of said level with the base of said J of said bracket spaced from said level, said bracket having spaced flanges along the outside longer leg of the J of said bracket, and having a plurality of screw means for clamping said bracket means to said level, b. a guide aperture extending transversely through the legs of said J of said bracket adjacent said base of the J of said bracket beyond an end of said level and through which aperture said measuring stick is freely slidable, c. longitudinally slidable rod means parallel to said level extending along said longer leg of the J of said bracket between said aperture and said central vial, said rod means being guided by apertures in said flanges on said bracket means, d. thumb-engaging manual means on said rod means between the two flanges most remote from said guide aperture and adjacent said central vial for longitudinally moving said rod means to disengage said knob from said measuring stick to permit said stick to slide freely through said guide aperture, whereby said measuring stick is movable and directly readable by a single operator of said tool from either side of said tool, e. spring means between said manual means and the flange which is most remote from said guide aperture for longitudinally urging said knob on said rod means toward said measuring stick for frictionally engaging said stick for normally preventing said stick from freely sliding through said guide aperture, and f. stop means on the other end of said rod means to prevent the longitudinal movement of said rod means past the aperture of said most remote flange.

6. A tool according to claim 5 wherein said measuring stick has a plurality of longitudinal surfaces upon each of which is indicated a different scale.

7. A tool according to claim 5 wherein said spring means comprises a helical spring around said rod means.

8. A tool according to claim 5 wherein said stick includes a stop means for limiting its longitudinal movement through said guide aperture.

* * * * *